3,597,150
DYEABLE HIGH POLYMER BLEND

Charles Noil Brown, Columbia, S.C., and Andor Schwarcz, Pompton Lakes, N.J., assignors to Uniroyal, Inc., New York, N.Y.
No Drawing. Filed Feb. 14, 1968, Ser. No. 705,303
Int. Cl. D06p 5/00
U.S. Cl. 8—168        9 Claims

ABSTRACT OF THE DISCLOSURE

This invention relates to rendering shaped articles or fibers, which contain either a polyolefin or polyester and a minor amount of a pyridine base polymer, dyeable with anionic dyes by contacting such articles or fibers with an anionic surfactant prior to or during the dyeing procedure.

---

The present invention relates to a method of enhancing the dyeability of shaped articles produced from fiber-forming compositions of matter comprising either an alphamonoolefin polymer or a polyester, and a minor amount of a pyridine-containing polymer. This method comprises treating said shaped articles with an anionic surfactant.

The method for treating the compositions of matter will be described herein mainly in terms of fibers (both staple and continuous filament), but it is to be understood that other useful forms may be used such as monofilaments, multifilaments, films, tapes, fibrillated tapes and molded, cast, drawn, or other shapes however formed, etc.

Poly-alpha-monoolefins and polyesters are well-known for being inherently undyeable by conventional dyeing techniques due either to lack of polar sites in their molecular structures to which dye molecules may become attached, or to difficulty of penetration of dye molecules into their molecular structures or both. Processes for overcoming the defects have long been sought, because good dyeability is a prerequisite for many commercial applications to which these polymers would be outstandingly suited.

U.S. Pat. No. 3,315,014 to Harry W. Coover, Jr. and Frederick B. Joyner discloses one method of rendering polypropylene fibers dyeable by blending a large amount, i.e. up to 20% of polymers of vinylpyridine into the polypropylene matrix. However, we have determined, by using the method disclosed in the aforesaid patent, that when minor amounts of the vinylpyridine polymer, i.e. less than 5% to 10%, are incorporated in a polypropylene fiber, it is relatively undyeable with acid dyes, metallized dyes and direct dyes (all anionic dyes) except for the production of pale tints, and this degree of dyeability is of little or no commercial utility.

When larger quantities of additive, i.e., in excess of 5% to 10%, are blended with a polyolefin such as polypropylene, or a polyester such as poly(ethylene terephthalate), the resulting fiber is dyeable with anionic dyes but such fiber has disadvantages such as (1) the physical properties are degraded; (2) the blended material, because of incompatibility of the mixed polymers, is difficult to extrude and process; (3) the fiber is somewhat rough and brittle due to the presence of the larger quantities of nitrogen polymer therein; and (4) the added expense of large amounts of nitrogen polymer is great. Thus, it is highly desirable to be able to achieve dyeability with anionic dyes in polyolefin and polyester fibers with the addition of 5% or less of added basic polymer. Our invention represents a practical method for achieving this end.

It is important to be able to dye modified polyalpha-monoolefin and polyester fibers with the large class of anionic dyes. These dyes are bonded into the fiber mainly with primary forces and consequently such dyed fibers show excellent fastness properties. Although blends of poly-alpha-monoolefins and nitrogen polymers are dyeable with disperse dyes, such dyes are held in the fiber only by means of secondary forces. Such dye fibers show poor fastness properties, such as fastness to light and to dry cleaning.

Although polyester fibers show acceptable fastness properties with disperse dyes, it is not possible to dye them by conventional dyeing techniques due to the difficulty of penetration of dyes into the fiber. Special procedures involving either carriers or high temperatures and pressures are therefore required to achieve acceptable depths of color, and these all have undesirable features such as expense, toxicity, etc.

It has been found that compositions of matter containing a major portion of fiber-forming alpha-monoolefin polymers, such as polypropylene, polyethylene, poly(4-methyl-1-pentene) etc., and polyesters such as poly(ethylene terephthalate) may be made dyeable conveniently and inexpensively using the method of the present invention.

The inherently undyeable alpha-monoolefin polymers comprise both homopolymers and copolymers of alpha-monoolefins, for example, copolymers with non-terminal olefins or with one or more other alpha-monoolefins, as well as block copolymers of alpha-monoolefins with each other and graft copolymers of alpha-monoolefins with polymers of other alpha-monoolefins. The class includes polyethylene, polypropylene, poly(3-methyl-1-butane), poly(4-methyl-1-pentane), copolymers of propylene and 3-methyl-1-butene, copolymers of propylene and 4-methyl-1-pentene, and copolymers of any of the foregoing monomers with each other and/or with other copolymerizable monomers. The preferred material is polypropylene, by which we mean any polymer of propylene and any copolymer containing predominantly polymerized propylene together with any other comonomer copolymerized therewith.

In addition to poly-alpha-monoolefins, the matrix material used to form the shaped articles or fibers may be a polyester. The polyesters are condensation polymers of dihydric alcohols with organo-dibasic acids, particularly dicarboxylic acids and including disulfonic acids, and self-condensation polymers of omega-hydroxy carboxylic acids. The preferred materials in our invention are poly(ethylene terephthalate), poly(ethylene isophthalate), poly-co-(ethylene terephthalate-isophthalate), and poly(1,4 - cyclohexylenedimethylene terephthalate). It will be understood that the invention is applicable to all film- and fiber-forming polyesters, in which the ester linkages are intralinear, including poly(alkylene alkanedioates), poly(cycloalkylenedimethylene alkanedioates), poly(alkylene arenedioates), poly(cycloalkylenedimethylene arenedioates), and analogous materials. Examples of the above-named polyesters are respectively, poly (ethylene adipate), poly(1,4-cyclohexylenedimethylene adipate), poly(ethylene terephthalate), and poly(1,4-cyclohexylenedimethylene terephthalate). Physically, as with the poly-alpha-monoolefins disclosed herein, the polyester may take the form of filaments, yarns, fabrics, tapes, fibrillated tapes, and films, or other shaped or molded forms presenting a high ratio of surface to volume.

The mono-and polycyclic pyridine base dye receptor polymer incorporated in the polyolefin or polyester in accordance with the invention is present either as a homopolymer or a copolymer with another monomer copolymerizable therewith including random, alternating, block, graft copolymers, etc. The mono- and polycyclic pyridine base dye receptor polymers used are those based, for example, on monovinylpyridines and monovinylquinolines.

The monovinylpyridines useful in making the above named dye-receptive polymers employed in the invention include 2-vinylpyridine, 3-vinylpyridine, 4-vinylpyridine, 5 - methyl - 2 - vinylpyridine, 2-ethyl-5-vinylpyridine, 2-methyl - 5 - vinylpyridine, 2-ethyl-6-vinylpyridine, 2-isopropenylpyridine, etc. Polymerizable olefinic monomers with which the monovinylpyridine may be copolymerized include acrylic and methacrylic esters typified by ethyl acrylate and methyl methacrylate; vinylaryl hydrocarbons typified by styrene and vinyltoluenes; and butadiene-1,3. Alternatively, the monovinylpyridine may be graft-copolymerized, by well-known methods, with a previously formed linear high polymer, typified by polyethylene, polypropylene, poly(ethylene terephthalate), polystyrene, and polybutadiene.

Although the invention is applicable in the range of 0.5 to 10% (by weight of fiber) content of pyridine-containing polymer in the fiber, it is preferred to employ the range of 1 to 5%, the particular amount depending upon the nitrogen content. This lower range is advantageous because of the high cost of the pyridine-containing polymers and because it minimizes any undesirable effects on the physical properties of the fiber. The presence of 1 to 5% of pyridine-containing polymer in the fiber is usually sufficient to exhaust a 1% or 3% OWF (on the weight of the fiber) dye bath, each of which gives deep colors with most dyes. It has been determined that at least 3% pyridine base polymer should be blended with a polyester if commercial dyeability of the resulting fiber is to be obtained, however lesser amounts can be used if desirable. In terms of the actual nitrogen content of the fiber, a minimum of 0.13% nitrogen in the fiber is required. The optimum properties are obtained when the range is between about 0.25% and 0.50% nitrogen (weight percent of pyridinic nitrogen in the fiber).

In addition to the components listed above, the fiber may also contain between about 0.5% and 5% of a hydrophilic compound which is either a homopolymer of ethylene oxide, derivatives thereof, or a polymer of ethylene oxide. The presence of these compounds in polyester fiber allows the use of lesser amounts, as little as 1%, of pyridine base polymers to dye in deep shades according to this invention. Such compounds are described in U.S. application Ser. No. 679,618, filed Nov. 1, 1967 by Andor Schwarcz.

The present invention consists of treating the shaped article or fiber as described herein with an anionic surfactant under acidic conditions. The product resulting from this treatment is intensely dyeable with anionic dyes. A large number of anionic surfactants including representatives of all of the known classes of said surfactants has been found to be operative in the process of this invention. All anionic surfactants can thus be used in the present invention, subject to the limitations set forth herein.

It is well known in the art of dyeing fibers containing basic dye sites, such as wool or nylon, with anionic dyes, that anionic surfactants markedly decrease the dye uptake of said fibers. Thus, these surfactants are used either for retarding and leveling (i.e. slowing and making uniform) the dyeing, or stripping the dye from a previously dyed fiber. Surprisingly, in the present invention, it has been found that the application of anionic surfactants to shaped articles or fibers made from poly-alph-monoolefins or polyesters blended with the basic nitrogen-containing polymers described herein results in absorption of the surfactant by the fiber and greatly accelerates and enhances the dye uptake.

The anionic surfactants used in accordance with the process of the present invention have the general formula (R–A) wherein R represents a hydrophobic group which is a substituted or unsubstituted alkyl, aryl or alkylaryl group in which the total member of carbon atoms in said groups is 6 or more carbon atoms (preferably between 10 and 40 carbon atoms) per A group; and A is an anionic group exemplified by one or more of the following: (1) sulfonate; (2) sulfate; (3) phosphate or polyphosphate; (4) carboxylate; etc. The A group can be in the free acid form or in the salt form. Another type of anionic surfactant which can be used is one wherein R contains a polyoxyalkylene group. It is to be understood that additional materials which are operative in this invention are those which generate anionic surfactants in situ during the process of this invention.

The increase in dyeability which is within the scope of the present invention is a function of the amount of anionic surfactant absorbed by the article or fiber prior to or during the dyeing step. It has been determined that absorption of generally between about 0.05% (OWF) and 5% (OWF) of an anionic surfactant by the shaped article or fiber as described herein results in increased dyeability with acid type dyes by such article or fiber.

The preferred range of absorption of anionic surfactant by the article or fiber treated which results in the greates enhancement of dyeability is between about 0.3% (OWF) and 3% (OWF).

The anionic surfactant may be applied to the article or fiber prior to, or during the dyeing process. The concentration of the anionic surfactant when applied prior to dyeing or in the dyebath, depending upon when it is applied, will vary between about 0.3% (OWF) and 32% (OWF). This concentration range is the range which will most conveniently result in absorption of said anionic surfactant within the general range of absorption described above; however, other concentrations outside this range may be used as long as absorption of surfactant within the specified absorption range occurs.

Examples of anionic surfactants suitable for use in the present invention are:

| Name or Trademark | Chemical name or formula |
| --- | --- |
| Sodium laurylsulfate | Sodium dodecylsulfate. |
| Sodium cetylsulfate | Sodium hexadecylsulfate. |
| Aerosol OT | Dioctyl ester of sodium sulfosuccinic acid. |
| Aerosol TR | Bis(tridecyl) ester of sodium sulfosuccinic acid. |
| Nacconol NRSF | Sodium dodecylbenzene sulfonate. |
| Tergitol 15-S-3A | $C_{13}H_{27}O-(CH_2-CH_2-O)_3-SO_3NH_4$ |
| Victawet 35B | Aliphatic phosphate ester: (2-ethylhexyl)$_5$—Na$_5$(P$_3$O$_{10}$)$_2$. Diethanol amine salt of a 1:1 mixture of mono- and difatty alcohol phosphates (made from the fatty alcohols plus $P_2O_5$). |
| Sandopan 6624 | $C_{12}H_{25}O-(CH_2-CH_2O)_7-CH_2-COONa$. |

As indicated the anionic surfactant may be applied to the fiber at any stage of processing subsequent to shaping. This application step may be integrated into any of the large number of processing steps undergone by the fiber, such as spinning, drawing, winding, crimping, bleaching, prescouring, etc. In this way no separate treatment step is needed.

There are no critical limitations which must be observed when applying the anionic surfactant to the shaped article or fiber, with the exception that the treatment must be carried out under acidic conditions. The preferred range of pH at which this treatment is carried out is between 1 and 4. Nonionic surfactants commonly used in dyeing and wet processing of fibers can markedly decrease the enhancement of dyeability brought about by the present invention. For greatest dyeability, therefore, the presence of nonionic surfactants in combination with the anionic surfactants of this invention is to be avoided, unless it is desired to attenuate the great enhancement of dyeability caused by the anionic surfactant.

The surfactants used in the present invention may be added to an acidic dyebath containing a mineral or organic acid, such as sulfuric acid, phosphoric acid, formic acid or acetic acid, and an anionic dyestuff, such as an acid, metallized or direct dyestuff, at a pH between 0 and 5 and preferably between 1 and 4.

When the anionic surfactant is used in the dyebath according to the present invention, one finds that as its concentration increases from a value of zero, the dye uptake of the fiber increases correspondingly until maximum dyeability is attained. This maximum dyeability can be either at a single point or over a range of anionic surfactant concentrations. From this optimum region on, as the contration of surfactant is further increased, the dye uptake decreases and eventually reaches the original level of the fiber dyed without anionic surfactant. The above relationship applies at any given dye concentration in the dyebath.

When the anionic surfactant is applied to and absorbed by the article or fiber in the dyebath, the amount of absorption of anionic surfactant by said article or fiber may in some cases be difficult to measure quantitatively. This difficulty may, in part, be due to the absorption and desorption of anionic surfactant resulting from the displacement reaction between the anionic dyes in the dyebath and the anionic surfactant absorbed into the fiber. Even though the anionic surfactant and anionic dyestuff contact the article or fiber simultaneously in the dyebath, it is still necessary for an article or fiber so treated to absorb between about 0.05% (OWF) and 5% (OWF) (preferably between about 0.3% (OWF) and 3% (OWF)) of anionic surfactant from the dyebath in order to possess suitable enhanced dyeability in accordance with this invention. In view of the difficulty of measuring the absorption of anionic surfactant by the article or fiber in the dyebath, it may be convenient to use an alternative parameter which expresses the conditions in the dyebath under which enhanced dyeability is obtained rather than using an absorption value. The parameter is the ratio of the concentrations (g./liter) of dyestuff (D) to surfactant (S) in the dyebath. The range of the optimum values of $D/S$ which results in the greatest dyeability, is not dependent on D or S alone, but on their ratio, and is likewise independent of the amount of fiber. By operating within the optimum dyeability range of $D/S$ values, the article or fiber absorbs the required amount of anionic surfactant which results in the enhanced dyeability within the scope of the present invention. The optimum range of $D/S$ is determined by the structures of dye and surfactant. While there is no absolute scale of hydrophilicity of various anionic dyes and anionic surfactants, comparisons of the different degrees of hydrophilicity can be made on the basis of the number of hydrophobic groups, i.e., carbon atoms, relative to the number of hydrophilic groups, i.e., anionic groups in the dye or surfactant molecule. Thus, the said $D/S$ ratio is smaller for the less hydrophilic dyes and more hydrophilic surfactants and is larger for the more hydrophilic dyes and the less hydrophilic surfactants.

As an example, with Anthroquinone Blue Sky (Acid Blue 78) the optimum value of $D/S$, giving the greatest dyeability, is between 2 and 5 with sodium laurylsulfate. For Alizarin Direct Violet EBB (Acid Blue 56) with sodium laurylsulfate, however, this ratio is between 5 and 15. The optimum value of $D/S$ can be readily determined with any dye-surfactant pair.

When the anionic surfactant is applied prior to dyeing, it may be applied by simple contact of the fiber with the anionic surfactant, the surfactant being either neat or in solution. Temperature and duration of treatment are not critical except to allow absorption of a sufficient amount of surfactant as indicated above. The application of the anionic surfactant can usually be done at ambient temperatures and a contact time of a few hours or less. In some cases, somewhat higher temperatures or longer times are required.

After treatment with the anionic surfactant, the fiber may be scoured before dyeing if desired, and dyed by immersion in a dyebath containing an anionic dye.

Some of the strong acid dyes useful in the present invention are typified by the following:

Acid Yellow 23 (C.I. No. 19140)
Acid Orange 7 (C.I. No. 15510)
Acid Red 73 (C.I. No. 27290)
Acid Blue 45 (C.I. No. 63010)
Acid Blue 78 (C.I. No. 62105)
Acid Blue 56 (C.I. No. 62005)
Acid Violet 51 (C.I. No. 62165)

Another useful category of anionic dyes is the acid metallized dyes, typified by:

Acid Yellow 54 (C.I. No. 19010)
Acid Orange 72 (C.I. No. 18740)
Acid Red 186 (C.I. No. 18810)
Acid Blue 158 (C.I. No. 14880)

Still another useful category of anionic dyes is the neutral metallized dyes typified by the following:

Acid Yellow 121 (C.I. No. 18690)
Acid Orange 60 (The half-chrome complex of 1-phenyl-3-methyl-4-(2-hydroxy-5-sulfamoyl phenylazo)-5-pyrazolone)
Acid Red 209
Acid Blue 168

Another category of anionic dyes is the direct dyes, typified by the following:

Direct Yellow 44 (C.I. No. 29000)
Direct Red 13 (C.I. No. 22155)
Direct Blue 67 (C.I. No. 27925)

Other categories of anionic dyes which are applicable to our invention are the reactive dyes, typified by Reactive Orange 1, and the mordant acid dyes, typified by Mordant Red 3 (C.I. No. 58005).

In order to disclose more clearly the nature of the present invention, specific examples of the practice of the invention are hereinafter given. It should be understood, however, that this is done solely by way of example and is intended neither to delineate the scope of the invention nor to limit the ambit of the appended claims.

EXAMPLE 1

Three (3) parts of a 1:1 copolymer (by weight) of 2-vinylpyridine and 2-methyl-5-vinylpyridine (prepared by suspension polymerization using azo-bis-isobutyronitrile as initiator, and having intrinsic viscosity 0.9, measured in pyridine at 30° C.) were blended in an extruder at 500° F. with 100 parts of isotactic polypropylene (melt index 5-6), and the resultant blend was chopped into pellets and dried. The pellets were then melt extruded at 530° F. into a 156-filament yarn using a conventional melt-spinning apparatus. The resultant yarn was drawn 4:1 at 275° F. and texturized to yield a drawn yarn of 22 denier/filament. Its tenacity was 3.1 grams/denier and its elongation at break 35%.

The yarn was then either knitted into a fabric or tufted in jute into a carpet and dyed using a conventional dyeing procedure as follows:

The article was pre-rinsed with cold water, and dyed for one hour at 210°–212° F. in a dyebath containing a surfactant as listed in Table I, 1% OWF Acid Orange 60, and 3% OWF formic acid. (Bath/fabric ratio—30:1.) The article was then post scoured for 10 minutes at 160° F. as follows: bath/fabric ratio—30:1, 1% OWF of a nonionic surfactant.

The visual color intensities of the dyed samples obtained by using different surfactants in the dyebath are listed in Table I.

TABLE I

Surfactant

| Commercial name or trademark | Chemical name or formula | Type | Applied concentration (percent OWF)[1] | Dyed sample color intensity[2] |
|---|---|---|---|---|
| Sodium laurylsulfate | $C_{12}H_{25}SO_4Na$ | Anionic | 4 | E |
| Sodium tetradecylsulfate | $C_{14}H_{29}SO_4Na$ | do | 4 | E |
| Sodium cetylsulfate | $C_{16}H_{33}SO_4Na$ | do | 4 | E |
| Aerosol TR | Bis(tridecyl) ester of sodium sulfo succinic acid. | do | 4 | E |
| Aerosol OT | Dioctyl ester of sodium sulfosuccinic acid. | do | 4 | E |
| Aerosol AY | Diamyl ester of sodium sulfosuccinic acid. | do | 10 | G |
| Tergitol 15-S-3A | $C_{13}H_{27}O-(CH_2-CH_2-O)_3-SO_3-NH_4$ | do | 4 | E |
| Tergitol 15-S-3S | $C_{13}H_{27}O-(CH_2-CH_2-O)_3-SO_3-Na$ | do | 4 | E |
| Sandopan 6624 | $C_{12}H_{25}O-(CH_2-CH_2-O)_7-CH_2-COONa$ | do | 15 | VG |
| Victawet 35B | $(2\text{-ethylhexyl})_5Na_5(P_3O_{10})_2$ | do | 4 | E |
| Barisol Super BRM | Aliphatic phosphated ester | do | 4 | E |
| Alkapent CC | Aliphatic phosphated ester, acid form | do | 4 | E |
| Alkapent M60 | Aromatic phosphated ester, acid form | do | 4 | E |
| Chemsol 700-S | Modified organic phosphated ester | do | 6 | E |
| Chemsol 935-N | Phosphated ester of long chain fatty alcohol. | do | 4 | E |
| Estranol CP | Alkyl phosphate | do | 4 | E |
| Alkapent A | Aliphatic phosphated ester, free acid | do | 4 | E |
| Gafac RS-610 | Phosphated ester | do | 4 | E |
| Gafac LO-529 | Sodium salt of a phosphated ester | do | 4 | E |
| Zelek UN | Fatty alcohol phosphate | do | 4 | E |
| Zelek NK | do | do | 4 | E |
| Solar 25 | Coconut oil fatty acid amine condensate | do | 4 | E |
| Laureltex 802 | K salt of a phosphated alcohol | do | 4 | E |
| Rozak BD-100 | Phosphated ethoxylated oleylalcohol | do | 4 | E |
| Fosterge LF acid | Organo-phosphoacid | do | 4 | E |
| Seycopen BB | Phosphated polyalcohol | do | 4 | E |
| Crestol | Phosphated complex alcohol | do | 4 | E |
| Warcosol NF/3 | Complex of sulfonated polyester and phosphated alcohol. | do | 4 | E |
| Surfactant QS-44 | Phosphated ester, free acid | do | 4 | E |
| Detergent 9294 | Anionic phosphate ester | do | 32 | E |
| Seyco Phosphonic Acid | Aromatic phosphated ester, free acid | do | 4 | E |
| Triton X-45 | Octylphenol-$(CH_2-CH_2-O)_5H$ | Nonionic | 1 | P |
|  | Octylphenol-$(CH_2-CH_2O)_5H$ | do | 4 | P |
|  | Same | do | 15 | P |
|  | do | do | 50 | P |
| Triton X-100 | Octylphenol-$(CH_2-CH_2-O)_{9-10}-H$ | do | 1 | P |
|  | Same | do | 4 | P |
|  | do | do | 15 | P |
|  | do | do | 50 | P |
| Triton X-305 | Octylphenol-$(CH_2-CH_2-O)_{30}-H$ | do | 1 | P |
|  | Same | do | 4 | P |
|  | do | do | 15 | P |
|  | do | do | 50 | P |
| Tergitol 15-S-9 | Tridecyl-O-$(CH_2-CH_2-O)_9H$ | do | 5 | P |
| None | None |  |  | P |

[1] Based on 100% concentration of the surfactant. (To convert percent OWF to weight percent concentration in the dyebath, divide the OWF value by the bath/fiber ratio.)
[2] Visual color intensity measured according to the following cale: E=excellent; VG=very good; G=good; F=fair; P=poor.

This example illustrates the great variety of anionic surfactants which can be utilized in the present invention to improve the dyeability of a modified polypropylene fiber.

EXAMPLE 2

Various parts of poly(2-vinylpyridine) (PVPy), prepared by the same procedure as in Example 1, were milled at 320° F. with various parts of polyethylene glycol (PEG) of 4 million molecular weight. The milled samples were then blended with 100 parts of poly(ethylene terephthalate) (PET), extruded at 540° F. into 28 filament yarn and drawn 5:1 using a pin at 165° F. and a plate at 340° F., to yield yarns of about 4.5 g./denier tenacity and 6% elongation. Skeins of these yarns were dyed as in Example 1 in the presence of different anionic surfactants at various concentrations in the dyebath. The visual color intensities obtained are listed in Table II.

TABLE II

| Amounts of additives (parts/100 of PET) | | Dye 3% (OWF)[1] | Anionic surfactant | | |
|---|---|---|---|---|---|
| PVPy | PEG | | Type | Applied concentration (percent OWF) | Dyed fiber color intensity[2] |
| 3 | 3 | Acid Orange 60 | Aerosol OT | 0.5 | VG |
| 3 | 3 | do | do | 1.5 | E |
| 3 | 3 | do | do | 20 | E |
| 3 | 3 | do | do | 60 | G |
| 3 | 3 | do | Aerosol AY | 1 | P |
| 3 | 3 | do | do | 4 | F |
| 3 | 3 | do | do | 10 | F-G |
| 3 | 3 | do | do | 20 | VG |
| 3 | 3 | do | do | 40 | VG |
| 3 | 3 | do | Sodium dodecylsulfate | 2 | E |
| 3 | 3 | do | Sodium hexadecylsulfate | 2 | E |
| 3 | 3 | do | Sodium dodecylbenzenesulfonic acid | 3 | E |

| Amounts of additives (parts/100 of PET) | | Dye 3% (OWF)[1] | Anionic surfactant | | Dyed fiber color intensity[2] |
|---|---|---|---|---|---|
| PVPy | PEG | | Type | Applied concentration (percent OWF)[1] | |
| 3 | 3 | ----do---- | Alkapent CC | 3 | E |
| 3 | 3 | ----do---- | Barisol Super BRM | 4 | F |
| 3 | 3 | ----do---- | ----do---- | 10 | G |
| 3 | 3 | ----do---- | ----do---- | 20 | VG-E |
| 3 | 3 | ----do---- | ----do---- | 40 | G-VG |
| 3 | 3 | Acid Blue 78 | Sodium dodecylsulfate | 2 | E |
| 3 | 3 | Acid Blue 80 | ----do---- | 2 | E |
| 2 | 4 | Acid Orange 60 | ----do---- | 3 | E |
| 2 | 5 | ----do---- | ----do---- | 3 | E |
| 2 | 6 | ----do---- | ----do---- | 3 | E |
| 2 | 4 | Acid Blue 60 | ----do---- | 3 | E |
| 2 | 5 | ----do---- | ----do---- | 3 | E |
| 2 | 6 | ----do---- | ----do---- | 3 | E |
| 1 | 6 | Acid Orange 60 | ----do---- | 3 | G |
| 1 | 8 | ----do---- | ----do---- | 3 | G |
| 1 | 10 | ----do---- | ----do---- | 3 | G |
| 3 | 0 | ----do---- | ----do---- | 3 | F |
| 4 | 0 | ----do---- | ----do---- | 3 | VG |

[1] 90:1 dyebath to fiber ratio, 9% OWF HCOOH.
[2] P=Poor; F=Fair; G=Good; VG=Very good; E=Excellent.

Fibers having the same compositions as those described in Table II were then dyed using the dyestuffs disclosed therein in combination with a nonionic surfactant (Triton X-100). These fibers dyed to a much lighter intensity of color (at any concentration of nonionic surfactant) than was obtained using an anionic surfactant. Fibers having identical compositions to those described in Table II, dyed with the identical dyestuffs and no surfactants, were also much lighter, and of lesser color intensity, than the fibers dyed with anionic surfactants.

This example shows the variety of anionic surfactants which can be utilized in this invention to improve the dyeability of modified poly(ethylene terephthalate) fibers.

EXAMPLE 3

Fibers containing 3 parts of different types of vinyl pyridine polymers and 100 parts of isotactic polypropylene were prepared and dyed with 3% OWF Acid Orange 60 by the same procedure as in Example 1. The visual color intensities of the dyed samples obtained with the use of 4% OWF of an anionic surfactant, sodium dodecylsulfate, in the dyebath are listed in Table III. All of the fibers, when dyed without any surfactant or in the presence of nonionic surfactants, such as Triton X-100 or Tergitol 15-S-9, at various concentrations, yielded only pale shades.

TABLE III

Dye receptor:[1]     Dyed sample color intensity
    Poly(2-vinylpyridine) _____ Excellent.
    Copolymer (50% 2-vinylpyridine—50% 2-methyl-5-vinylpyridine) (percent by weight) _____ Excellent.
    Copolymer (70% 2-vinylpyridine—30% styrene) (percent by weight) _____ Excellent.

[1] These dye receptors were prepared by the method described in Example 1.

This example shows the variety of pyridine base dye receptors which can be utilized in the present invention to improve the dyeability of modified polypropylene fibers with anionic surfactant.

EXAMPLE 4

Fibers, prepared by the same procedure as in Example 1, from isotactic polypropylene, 3 parts per 100 of resin (phr.) of a 1:1 copolymer of 2-vinylpyridine and 2-methyl-5-vinylpyridine, and 2 phr. of polyethylene glycol (PEG) compounds of various molecular weights (M.W.) and compositions were dyed with 3% OWF Acid Orange 60 by the same procedure as in Example 2. The compositions of the polyethylene glycol compounds and the visual color intensities obtained by using 2% OWF sodium dodecylsulfate in the dyebath are listed in Table IV.

TABLE IV

Composition of the polyethylene glycol compounds:     Dyed samples color intensity
    PEG, M.W.=4,000,000 _____ Excellent.
    PEG, M.W.=200,000 _____ Excellent.
    PEG, M.W.=20,000 _____ Excellent.
    PEG, M.W.=4,000 _____ Very good.
    PEG, M.W.=600 _____ Excellent.
    PEG—monostearate, M.W. (PEG)= 4,000 _____ Very good.
    Octylphenol condensate with 10 moles of ethylene oxide _____ Very good.
    PEG—polypropylene glycol block copolymer, 70% (by weight) of PEG, total M.W.=6,800 _____ Very good.

Fibers, having the same composition as those described in Table IV, were similarly dyed using Acid Orange 60, but in combination with a nonionic surfactant (Triton X-100). These fibers dyed to a much lighter color (at any concentration of nonionic surfactant) than was obtained using an anionic surfactant. Fibers, having the identical compositions as those described in Table IV and dyed with Acid Orange 60 and no surfactants, were also much lighter than the fibers dyed with anionic surfactants.

This example shows that the fibers used in the present invention may be modified by polyethylene glycol compounds priod to spinning.

EXAMPLE 5

Fibers prepared from poly-2-vinylpyridine, polyethylene glycol and a major portion of polyolefin or polyester were dyed with 3% OWF of either Acid Orange 60 or Acid Blue 78 by the same procedure as in Example 2. The composition of the fibers and the visual color intensities obtained by using 4% OWF sodium dodecylsulfate in the dyebath are listed in Table V.

TABLE V

| Base polymer | Dye receptor Type | Parts/100 of base polymer by weight | Polyethylene glycol Molecular weight | Parts/100 of base polymer | Dyed sample color intensity |
|---|---|---|---|---|---|
| Polypropylene | Poly(2-vinylpyridine) | 3 | | None | Excellent. |
| Do | do | 3 | 4,000,000 | 2 | Outstanding. |
| Poly-4-methyl-1-pentene | do | 3 | | None | Excellent. |
| Do | do | 3 | 4,000,000 | 2 | Outstanding. |
| Poly(ethylene terephalate) [1] | do | 3 | 4,000,000 | 3 | Excellent. |
| Do.[1] | do | 4 | | None | Very good. |

[1] Fibers base on poly(ethylene terephthalate) were prepared by the same procedure as in Example 2.

Fibers, having the same composition as those described in Table V, were similarly dyed using Acid Orange 60, but in combination with a nonionic surfactant (Triton X–100). These fibers dyed to a much lighter color (at any concentration of nonionic surfactant) than was obtained using an anionic surfactant. Fibers, having the identical compositions as those described in Table V and dyed with Acid Orange 60 and no surfactant, were much lighter than the fibers dyed in the presence of anionic surfactants.

This example shows the different base resins which can be used for the preparation of the fibers of this invention.

EXAMPLE 6

The yarn prepared in Example 1 was immersed at ambient temperature in a solution containing 6% Alkapent CC in water. Fifty percent (OWF) of this solution adhered to the surface of the yarn. The yarn so treated was allowed to remain 17 hours on a plate at ambient temperature whereupon analysis of the fiber disclosed that said yarn had absorbed 3% (OWF) Alkapent CC. The yarn was then dyed as in Example 1 with 3% OWF Acid Orange 60 or with 3% OWF Acid Blue 78 in the presence of a nonionic surfactant (Triton X–100) to yield deep shades.

Another sample allowed to absorb only 0.05% (OWF) Alkapent CC showed significant improvement in the dye uptake when compared to the untreated fiber.

Having thus described our invention, what we claim and desire to protect by Letters Patent is:

1. A shaped article comprising:
   (1) a fiber-forming poly-alpha-monoolefin or polyester matrix blended with
   (2) between about 1% and 5% of a basic polymer dye receptor selected from the group consisting of:
      (a) thermoplastic vinyl pyridine homopolymers,
      (b) thermoplastic copolymers of vinyl pyridine monomers with each other,
      (c) thermoplastic copolymers of vinyl pyridine monomers with ethylenically unsaturated monomers, and
   (3) between about 0.5 to 5% of ethylene oxide containing polymers selected from the group consisting of:
      (a) homopolymers of ethylene oxide
      (b) ether and ester derivatives thereof
      (c) copolymers of ethylene oxide and an alkylene oxide other than ethylene oxide
said shaped article being obtained by contacting an undyed shaped article comprising said (1), (2) and (3) with an anionic surfactant under acidic conditions to permit absorption of at least a portion of said anionic surfactant into said shaped article thereby enhancing the dyeability of said shaped article with anionic dyes.

2. The shaped article of claim 1 which has been dyed under acidic conditions, wherein said article has been concurrently contacted with said anionic surfactant and an anionic dyestuff in a dyebath.

3. The shaped article of claim 1 wherein the matrix is selected from polypropylene, poly(4-methyl-1-pentene), poly(ethylene terephthalate), poly(co-ethylene isophthalate terephthalate), and poly(1,4-cyclohexylene dimethylene terephthalate).

4. The shaped article of claim 1 wherein the basic dye receptor polymer is selected from
   (a) poly(vinylpyridines)
   (b) alkyl substituted poly(vinylpyridines)
   (c) poly(vinylquinolines)
   (d) alkyl substituted poly(vinylquinolines)
   (e) copolymers of a vinylpyridine monomer with an alkyl substituted vinylpyridine monomer
   (f) copolymers of vinylpyridine monomers with monoethylenically unsaturated monomers.

5. A fiber having the composition of claim 4 wherein the matrix is selected from polypropylene, poly(4-methyl-1-pentene), poly(ethylene terephthalate), poly(coethylene isophthalate-terephthalate) and poly(1,4-cyclohexylene-dimethylene terephthalate), and the homopolymers of ethylene oxide have a molecular weight between about 600 and 7,000,000.

6. A fiber having the composition defined in claim 5 wherein said anionic surfactant has the general formula R—A, wherein
   R represents a substituted or unsubstituted alkyl, aryl or alkylaryl group having at least 6 carbon atoms per A group, and
   A represents an anionic group.

7. A fiber having the composition of claim 6 wherein R has from 9 to 40 carbon atoms per A group.

8. The fiber defined in claim 5 wherein the basic dye receptor polymer is selected from
   (a) poly(2-vinylpyridine)
   (b) poly(2-methyl-5-vinylpyridine)
   (c) poly(4-vinylpyridine)
   (d) poly(2-vinylquinoline)
   (e) the copolymer of 2-vinylpyridine and 2-methyl-5-vinylpyridine
   (f) the copolymer of 2-vinylpyridine and styrene
   (g) the copolymer of 2-methyl-5-vinylpyridine and styrene.

9. The fiber defined in claim 8 wherein the matrix is polypropylene or polyethylene terephthalate, the basic dye receptor polymer is the copolymer of 2-vinylpyridine and 2-methyl-5-vinylpyridine, and the homopolymer of ethylene glycol has a molecular weight between about 100,000 and 4,000,000.

References Cited

UNITED STATES PATENTS

| 3,172,723 | 3/1965 | Hay | 8—130.1 |
| 3,314,743 | 4/1967 | Gagliordi | 8—31 |
| 3,329,557 | 7/1967 | Magat et al. | 161—172 |
| 3,361,843 | 1/1968 | Miller et al. | 260—857 |
| 3,375,213 | 3/1968 | Press | 260—17 |
| 3,432,250 | 3/1969 | Miller et al. | 8—100(CX) |

DONALD LEVY, Primary Examiner

U.S. Cl. X.R.

8—17, 19, 30, 31, 163, 171, 173